(12) United States Patent
Munir et al.

(10) Patent No.: US 11,108,542 B2
(45) Date of Patent: Aug. 31, 2021

(54) MULTI-PROCESSOR AUTOMOTIVE ELECTRONIC CONTROL UNIT

(71) Applicant: Board of Regents of the Nevada System of Higher Education, on behalf of the University of Nevada, Reno, Reno, NV (US)

(72) Inventors: Arslan Munir, Manhattan, KS (US); Bikash Poudel, Manhattan, KS (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 572 days.

(21) Appl. No.: 16/020,153

(22) Filed: Jun. 27, 2018

(65) Prior Publication Data
US 2019/0013930 A1 Jan. 10, 2019

Related U.S. Application Data

(60) Provisional application No. 62/537,187, filed on Jul. 26, 2017, provisional application No. 62/529,749, filed on Jul. 7, 2017.

(51) Int. Cl.
*H04L 9/06* (2006.01)
*G06F 11/16* (2006.01)
(Continued)

(52) U.S. Cl.
CPC ........ *H04L 9/0631* (2013.01); *G06F 11/1641* (2013.01); *H04L 9/0643* (2013.01);
(Continued)

(58) Field of Classification Search
CPC ... H04L 9/0631; H04L 9/0643; H04L 9/3243; H04L 2209/84; G06F 11/1641; G06F 11/183; G06F 2201/82; B60R 2325/108
See application file for complete search history.

(56) References Cited

U.S. PATENT DOCUMENTS 5,131,041 A * 7/1992 Brunner ................ H04L 49/557
370/219
7,890,750 B2 * 2/2011 Dempski .................. G09C 5/00
713/153
(Continued)

OTHER PUBLICATIONS

Munir, A., "Safety Assessment and Design of Dependable Cybercars: For today and the future", 6(2) Proc. of IEEE Consumer Electronics Magazine, Apr. 2017, 8 pages.
(Continued)

*Primary Examiner* — Linglan E Edwards
(74) *Attorney, Agent, or Firm* — Saul Ewing Arnstein & Lehr LLP; Kathryn Doyle; Brian R. Landry

(57) ABSTRACT

One aspect of the invention provides an automotive electronic control unit (ECU) including: an application processor; and one or more co-processors communicatively coupled to the application processor. The one or more co-processors are configured to: receive data from the application processor; encrypt the data received from the application processor; process the encrypted data to detect faults and generate secure data that is encrypted and free from faults; and communicate the secure data to the application processor.

17 Claims, 10 Drawing Sheets

(51) Int. Cl.
 H04L 9/32 (2006.01)
 B60R 16/023 (2006.01)
 G06F 11/18 (2006.01)
(52) U.S. Cl.
 CPC ........ *H04L 9/3242* (2013.01); *B60R 16/0231* (2013.01); *G06F 11/183* (2013.01); *G06F 2201/82* (2013.01)

(56) References Cited

U.S. PATENT DOCUMENTS

| | | | | |
|---|---|---|---|---|
| 8,856,538 | B2* | 10/2014 | Costin | H04L 9/3247 |
| | | | | 713/176 |
| 9,305,184 | B2* | 4/2016 | Mundra | H04L 9/3239 |
| 10,242,197 | B2* | 3/2019 | Zander | G06F 21/577 |
| 10,491,392 | B2* | 11/2019 | Bardelski | H04W 12/041 |
| 10,664,413 | B2* | 5/2020 | Fons | H04L 9/12 |
| 2004/0225885 | A1* | 11/2004 | Grohoski | H04L 63/164 |
| | | | | 713/189 |
| 2012/0117419 | A1* | 5/2012 | Hillman | G06F 11/1658 |
| | | | | 714/12 |
| 2018/0091483 | A1* | 3/2018 | Eiriksson | H04L 63/166 |
| 2018/0217942 | A1* | 8/2018 | Fons | G06F 12/1408 |
| 2018/0254903 | A1* | 9/2018 | Bardelski | H04L 9/3228 |

OTHER PUBLICATIONS

Munir, A. et al.,Design and Performance Analysis of Secure and Dependable Cybercars: A Steer-by-Wire Case Study, Proc. of IEEE Consumer Communications & Networking Conference (CCNC), Las Vegas, Nevada, Jan. 2016, 8 pages.

Munir, A. et al.,"D2CyberSoft: a Design Automation Tool for Soft Error Analysis of Dependable Cybercars", Proc. of 2016 13th IEEE Annual Consumer Communications & Networking Conference (CCNC), Jan. 9-12, 2016, 8 pages.

National Instruments, "What is the ISO 26262 Functional Safety Standard?", http://www.ni.com/White-paper/13647/en/, downloaded Jul. 21, 2017, 5 pages.

Northern Nevada Business View, University of Nevada, Reno's Cybersecurity Center develops faster, safer systems for autos, trucks, UAVs and buses, https://www.nnbusinessview.com/news/university-of-nevada-renos-cyb . . . , Feb. 13, 2017, 2 pages.

National Science Foundation, "CRII: CPS: Design of Secure and Dependable Next Generation Automotive Cyber-Physical Systems", https://nsf.gov/awardsearch/showAward?AWD_ID=1743490 &Historica . . . , downloaded Jun. 25, 2018, 3 pages.

Poudel, B. et al., "Design and Comparative Evaluation of GPGPU- and FPGA-based MPSoC ECU Architectures for Secure, Dependable, and Real-Time Automotive CPS", Proc. of 2017 IEEE 28th International Conference on Application-specific Systems, Architectures and Processors (ASAP) , Jul. 10-12, 2017, 8 pages.

Poudel, B. et al., Design and Evaluation of a Novel ECU Architecture for Secure and Dependable Automotive CPS, Proc. of 2017 14th IEEE Annual Consumer Communications & Networking Conference (CCNC), Jan. 8-11, 2017, 7 pages.

Swagman, K. et al., "Could your car be hacked? Smart cars pose cybersecurity concerns", Nevada Today, Feb. 10, 2017, 3 pages.

Wikipedia, "Triple modular redundancy", https://en.wikipedia.org/wikiariple_modular_redundancy, downloaded Jul. 1, 2017, 4 pages.

\* cited by examiner

MULTI-PROCESSOR AUTOMOTIVE ELECTRONIC CONTROL UNIT

CROSS-REFERENCE TO RELATED APPLICATION

This application claims priority under 35 U.S.C. § 119(e) to U.S. Provisional Patent Application Ser. No. 62/529,749, filed Jul. 7, 2017, and U.S. Provisional Patent Application Ser. No. 62/537,187, filed Jul. 26, 2017. The entire content of each of these applications is hereby incorporated by reference herein.

STATEMENT REGARDING FEDERALLY SPONSORED RESEARCH OR DEVELOPMENT

This invention was made with government support under Grant No. NSF-CRII-CPS-1564801 awarded by the National Science Foundation. The government has certain rights in the invention.

BACKGROUND OF THE INVENTION

Contemporary automobiles integrate multiple heterogeneous digital processors (electronic control units (ECUs)), radio interfaces, in-vehicle networks and protocols, and complex embedded software. The next generation of automobiles will further escalate the profusion of distributed control applications. For example, x-by-wire systems, where electronic controllers replace traditional mechanical and/or hydraulic subsystems, have emerged. In many instances, x-by-wire systems (e.g., steer-by-wire, brake-by-wire, etc.) have stringent real-time performance and reliability requirements that pose significant challenges for implementation over traditional, bandwidth-limited controller area network (CAN) protocol. CAN with flexible data (CAN FD) and FLEXRAY® are protocols that have been proposed as alternatives to the CAN protocol, as they offer higher speed data transfer and improved fault tolerance features as compared to CAN.

With the permeation of electronic components and systems into safety-critical automotive functions, integration of improved security and dependability into those components and systems becomes increasingly important. Further, the continuously escalating complexity of automotive systems and increasing integration with wireless entities (e.g., smart phones) exacerbates the security vulnerabilities of many automobiles. Furthermore, the operational environment within automobiles is harsh and electronic components experience external noise and radiation that render ECUs vulnerable to permanent and transient faults. Hence, improving the security and dependability of the electronic systems of an automobile will increase the robustness of automobiles to faults and security vulnerabilities. However, there is much difficulty in updating the security and dependability of the electronic systems within automobile, as they have hard constraints regarding the real-time communication between electronic systems.

Further, the evolving nature of cyber-attacks presents additionally challenges in integrating security primitives in automotive electronic systems (i.e., automotive cyber-physical systems (CPSs)). Further, the advancements in cryptanalysis and related technologies have the possibility to render various security mechanisms in effective. Most of the global initiatives on future automotive CPSs focus on the design of dedicated security solutions that could be embedded in future automotive ECUs. The security solutions are based on secure hardware extension, hardware security modules, and trusted platform modules, which are non-fault-tolerant (NFT) and/or are dedicated inflexible hardware designs. Hence, a successful attack on the security mechanism embodied in these standards would require a complete replacement of the ECUs leveraging these security standards, which may be very costly and/or infeasible. Further, as the automotive industry moves to incorporate more applications and features (e.g., voice recognition and object detection), ECUs with more computing power will be needed. As such, advanced security and dependability applications as well as support for additional applications, may not be effectively handled by contemporary microcontroller-based ECUs.

SUMMARY OF THE INVENTION

One aspect of the invention provides an automotive electronic control unit (ECU) including: an application processor; and one or more co-processors communicatively coupled to the application processor. The one or more co-processors are configured to: receive data from the application processor; encrypt the data received from the application processor; process the encrypted data to detect faults and generate secure data that is encrypted and free from faults; and communicate the secure data to the application processor.

This aspect of the invention can have a variety of embodiments. The one or more co-processors can be further configured to: receive second secure data from the application processor; decrypt the second secure data; process the decrypted data to detect faults and generate second data free from faults; and communicate the second data to the application processor.

Encrypting the data can include applying an encryption scheme and a message authentication code (MAC) to the data. The encryption scheme can be AES-128 encryption and the MAC can be SHA-3-based HMAC. The co-processor can include multiple processing cores. Each byte of the encryption scheme can be mapped to a separate thread for execution on a separate at least one core of a first set of the multiple processing cores. Each lane of the MAC can be mapped to a separate thread for execution on a separate at least one core of a second set of the multiple processing cores. The first set and second set can be non-overlapping. The separate at least one core of the first set of multiple processing threads can include a master encryption core and a slave encryption core. The separate at least one core of the second set of the multiple processing cores can include a master MAC core and a slave MAC core. Processing the encrypted data to detect faults and generate secure data that is encrypted and free from faults can include comparing results of the master encryption core and the slave encryption core and comparing results of the master MAC core and the slave MAC core. Encrypting the data can include implementing a plurality of redundant encryption scheme modules and a plurality of redundant MAC modules in parallel and comparing the results from each. Implementing the plurality of redundant encryption scheme modules and the plurality of redundant MAC modules in parallel can include implementing at least three of each of the modules. At least one of the plurality of redundant encryption scheme modules and at least one of plurality of redundant MAC modules can be configured to be implemented based upon a detection of a fault in another one of the plurality of redundant encryption scheme modules and another one of the plurality of redundant MAC modules. The one or more co-processors can be further configured to reconfigure one or more of the faulty redundant modules.

The one or more co-processors can be selected from the group consisting of: a field-programmable gate array (FPGA) and a general-purpose computing on graphics processing unit (GPGPU).

The application processor and the one or more co-processors can be communicatively coupled via an expansion bus. The expansion bus can implement the Advanced Microcontroller Bus Architecture (AMBA) standard.

The application processor and the one or more co-processors can be part of a first integrated circuit.

The application processor can be communicatively coupled with one or more sensors. The data can be received from at least one of the one or more sensors.

The one or more co-processors can include self-checking combinational circuits. The self-checking combinational circuits can be Berger-code-based totally self-checking combinational circuits.

DRAWINGS

For a fuller understanding of the nature and desired objects of the present invention, reference is made to the following detailed description taken in conjunction with the accompanying drawing figures wherein like reference characters denote corresponding parts throughout the several views.

Figure 10:
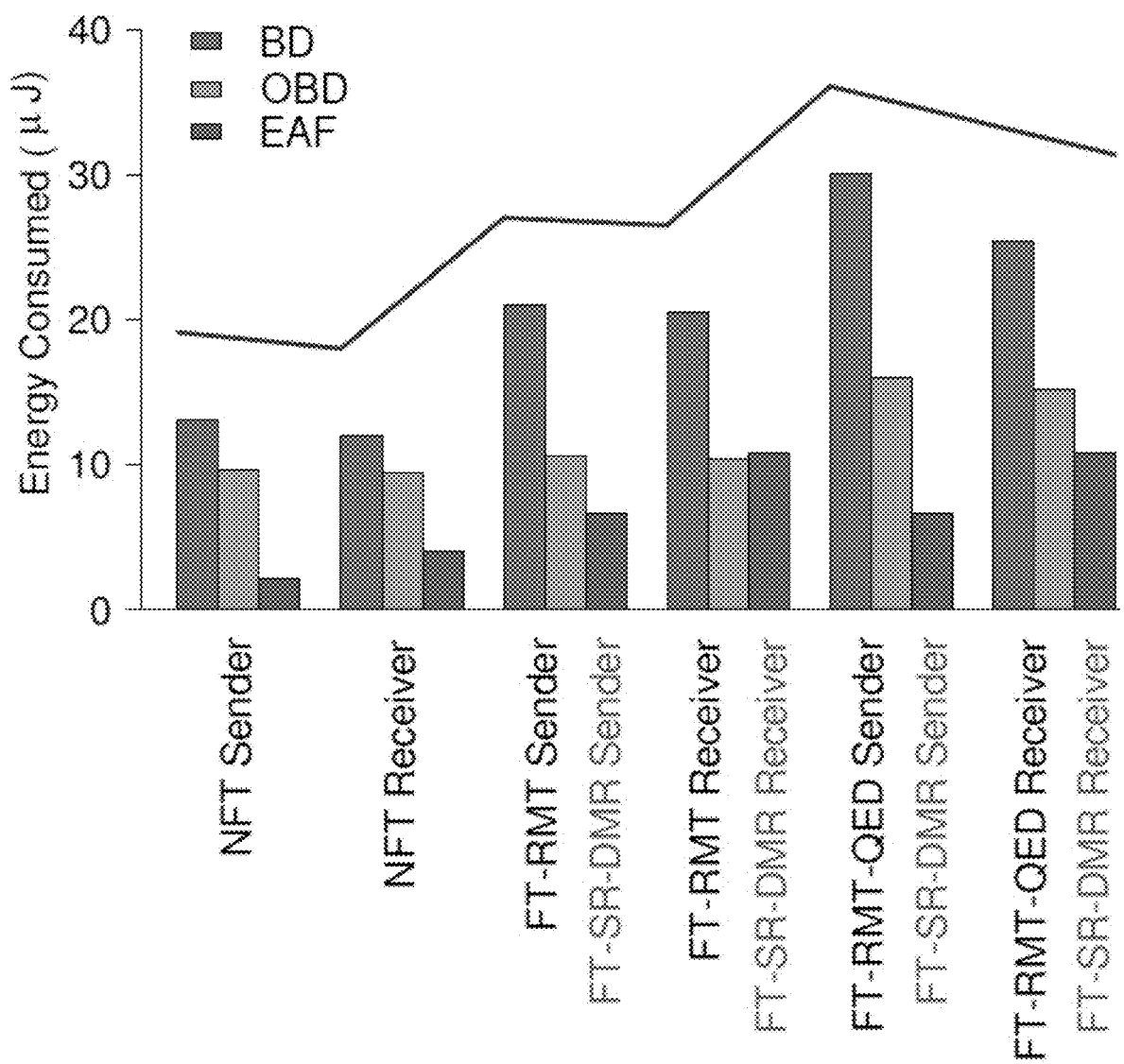

FIG. 10 compares energy consumption between various implementations.

DEFINITIONS

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

As the number of ECUs operating with modern automobiles increases, the risk of security attacks on the in-vehicle systems also increases. This situation is further exacerbated by the wireless connection to an increasingly wide range of external networks. For example, connections may include wireless local area networks, cellular networks, service garages, toll roads, drive-through windows, gas stations, and a rapidly growing list of automotive after-market applications. As such there is a need to provide improved security and dependability of automotive ECUs.

To improve security of ECUs, there is a need for improved confidentiality. For example, in-vehicle networks carry a mix of operational and personally identifiable information, such as current location, previous destinations, navigation history, call history, microphone recordings, financial transactions, and the like. An adversary invading an in-vehicle network could perform passive eavesdropping and traffic analysis, thus, obtaining critical information about the driver and the vehicle. In addition, for the x-by-wire systems, if an adversary knows the initial location of the vehicle, then, by eavesdropping on the steering angle, accelerator value, and braking value, the adversary could track the car, which might put the driver and passengers at risk. Hence, the confidentiality of messages and data over in-vehicle networks is critical for operational security, privacy, and consumer trust.

Further, ensuring the authentication and integrity of communication between ECUs provides improved security and dependability for the ECUs. For example, an attacker invading an in-vehicle network may attach their own device or compromise a valid user device (e.g., a cell phone attached to the infotainment system) in order to send fraudulent (or malicious) requests (commands, codes, or messages) into the system. Furthermore, the attacker's device may impersonate a valid ECU or gateway for malicious activities that may jeopardize safety of the driver and the vehicle. Additionally, the adversary may perform spoofing attacks by actively injecting and/or modifying messages in the in-vehicle network. Thus, improved entity authentication and message integrity increase the ability of in-vehicle networks to defend against these vulnerabilities.

Many current automotive electrical systems integrate a multitude of microcomputer units as ECUs to implement different automotive functions. The security features provided by many current designs are often implemented in dedicated inflexible hardware and are not adaptive to evolving nature of security attacks. Additionally, future automotive ECUs may require high computational power to integrate newly emerging applications and services. In various embodiments, the following disclosure describes ECU designs with scalable architectures that simultaneously integrate security and dependability primitives with low resources and energy overhead.

Figure 1:
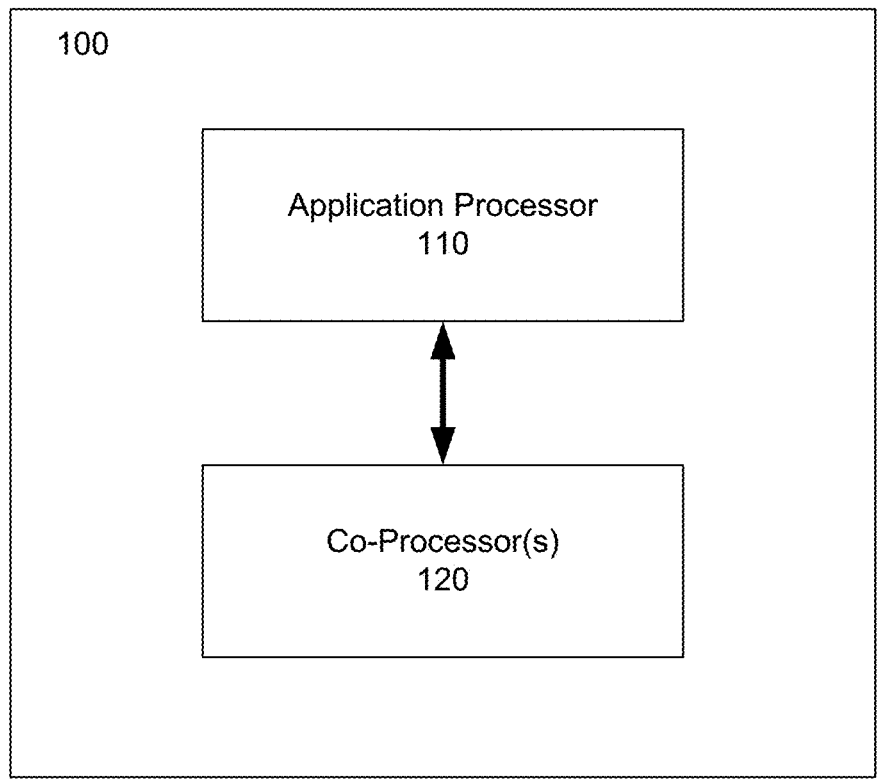
FIG. 1 illustrates an electronic control unit according to one or more embodiments of the disclosure.

FIG. 1 illustrates an automotive electronic control unit (ECU) 100 including application processor 110 and one or more co-processors 120 communicatively coupled to the application processor 110. The one or more co-processors 120 are configured to receive data from the application processor and encrypt that data. The one or more co-processors 120 are further configured to process the encrypted data to detect faults and generate secure data that is encrypted and free from faults. The one or more co-processors 120 are additionally configured to communicate the secure data to the application processor.

In various embodiments, the one or more co-processors 120 are configured to receive secure data from the application processor 110 and communicate decrypted, fault-free data to the application processor 110. In such embodiments, the one or more co-processors 120 decrypt the secure data and process the decrypted data to detect faults and generated data free from fault. Further, the one or more co-processors 120 can communicate the fault-free data to the application processor 110.

In one embodiment, to provide improved security services to the ECU, cryptographic algorithms are implemented within the one or more co-processors. Further, redundant multi-threading (e.g., use of parallel processing within different processing cores) and/or dual modular redundancy may be implemented for improved dependability (or fault tolerance).

Figure 2:
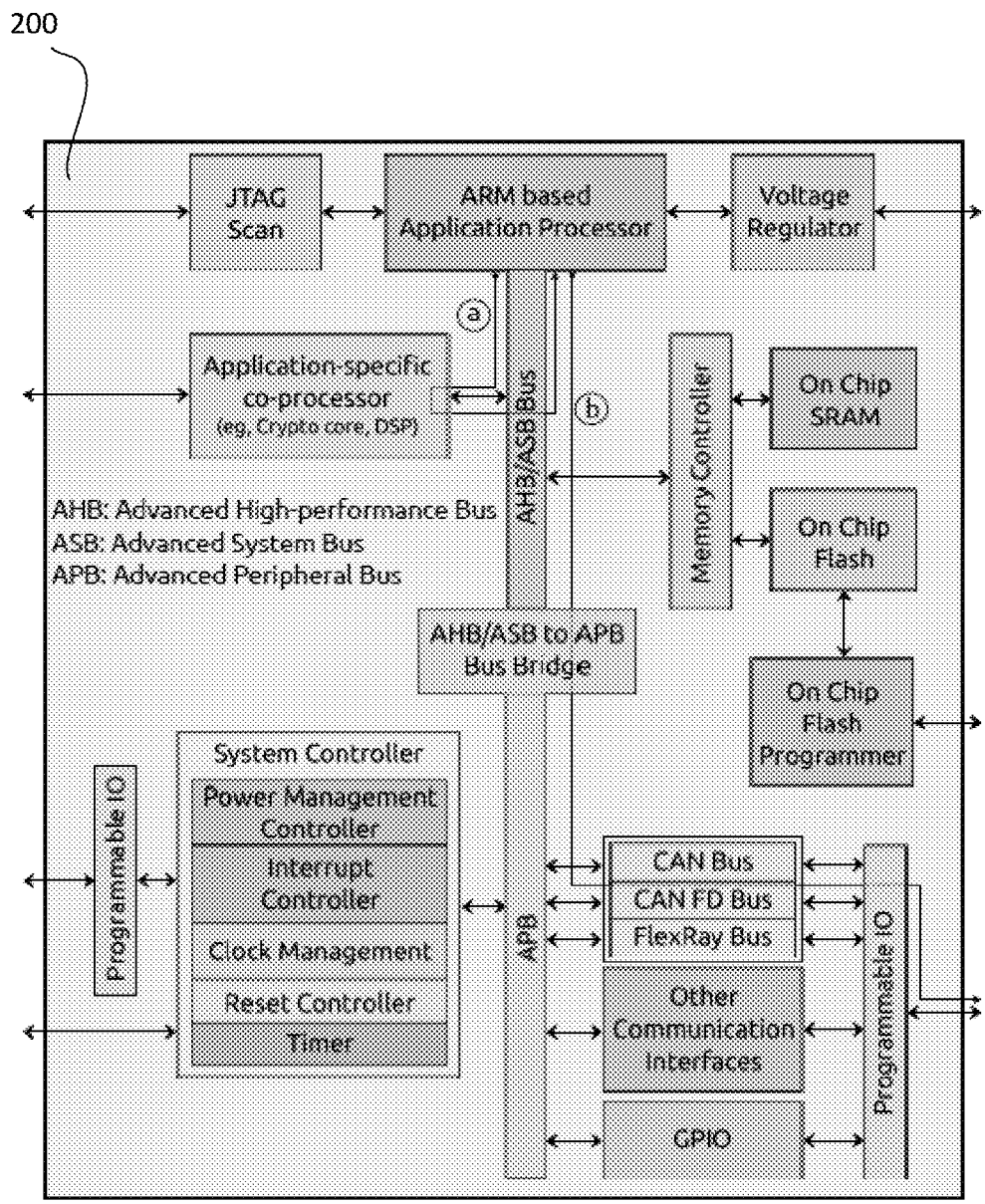
FIG. 2 illustrates a block diagram of an electronic control unit according to one or more embodiments of the disclosure.

FIG. 2 shows an embodiment of a generalized internal architecture 200 of the proposed multiprocessor system-on-chip (MPSoC) based ECU. In one embodiment, the ECU includes an ARM (Advanced RISC Machine)-based application processor as the main processor and one or more application-specific co-processors. This application processor can be configured to interface with one or more of the in-vehicle networks (e.g., CAN, CAN FD, FLEXRAY®, local interconnect network (LIN), Media Oriented Systems Transport (MOST), etc.), external sensors, other ECUs, and gateways. In various embodiments, the application processor is configured to execute control algorithms, perform data aggregation from various sensors, and outsource computationally intensive applications to one or more co-processors. The co-processors may be configured to perform compute-intensive applications like image, audio, and video processing. In various embodiments, the application-specific co-processor is one of a digital signal processor (DSP) and a crypto processor. In one embodiment, the co-processor is configured to perform asymmetric and/or symmetric cryptographic operations. Further, in one embodiment, the co-processor is a Viterbi processor for the realization of maximum-likelihood decoding of convolution codes, etc. In various embodiments, the application processor and co-processor communicate via one of an advanced system bus (ASB) and advanced high-one ECU with the application processor of another ECU through in-vehicle networks (e.g., CAN, CAN FD, or FLEXRAY®).

In one embodiment, the application processor collects data from one or more sensors within the automobile. Before communicating the data to another ECU, the application processor first sends the data to the co-processor via high-speed Advanced High-performance Bus (AHB) for encryption. The co-processor embeds the security primitives into the data, thus creating secure data and sends it back to the application processor. This is represented by path "a" in FIG. 2. The secure data may then be sent to another ECU via path "b".

In one embodiment, the one or more co-processors may be at least one of a general purpose on graphics processing units (GPGPU) and a programmable logic array (e.g., field-programmable gate array (FPGA) or similar device). Exemplary FPGAs are available under the XILINX® AUTOMOTIVE™ (XA™) SPARTAN®-6 mark from Xilinx Inc. of San Jose, Calif. The one or more co-processors may be configured to provide cryptographic services. For example, the one or more co-processors are configured to provide one or more of confidentiality, message authentication and message integrity services.

Figure 3:
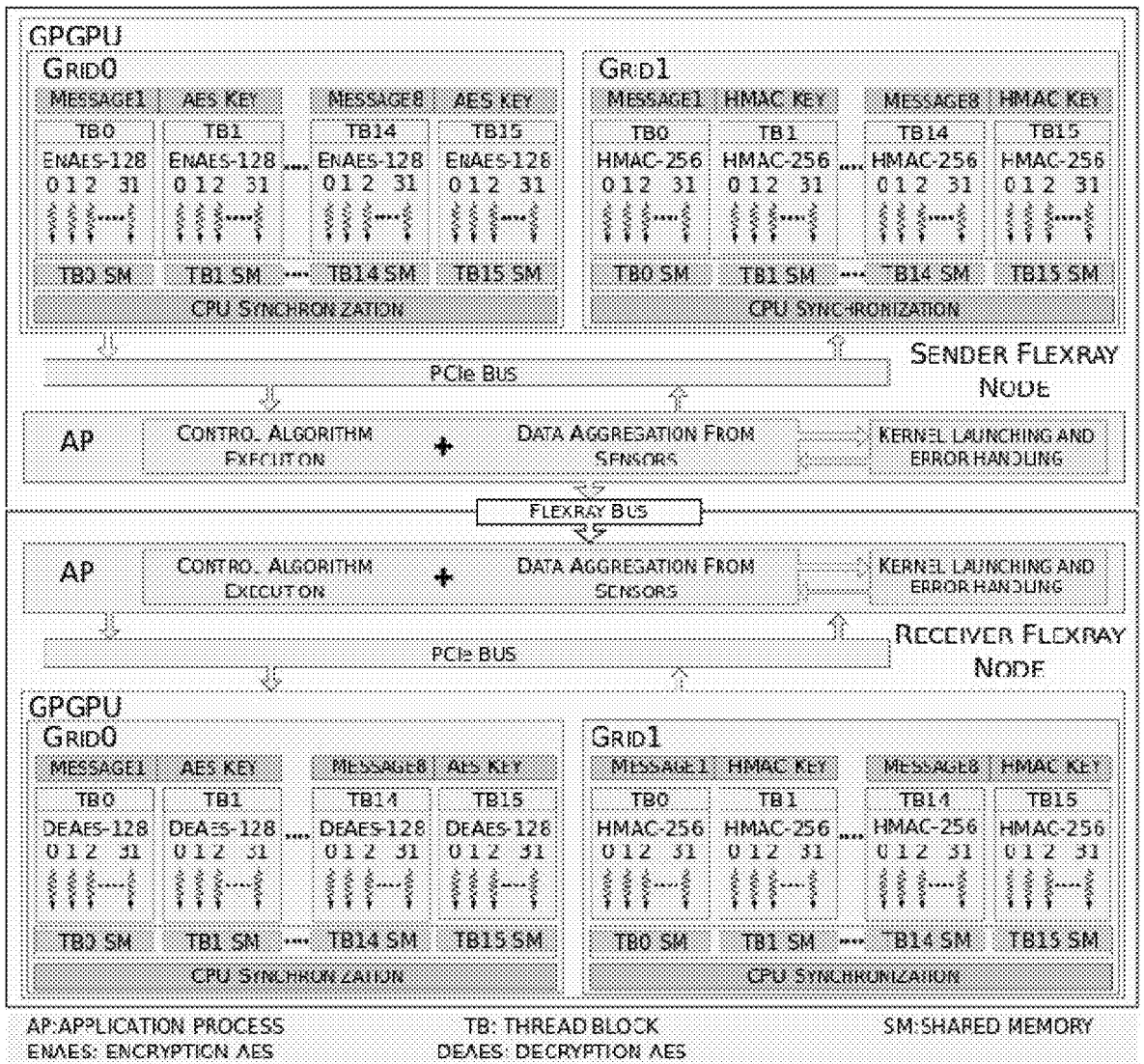
FIG. 3 illustrates a block diagram of an electronic control unit having a multi-core co-processor according to one or more embodiments of the disclosure.

FIG. 3 illustrates high-level architecture of ECU 300. In the illustrated embodiment, ECU 300 includes an ARM-based application processor as the master processor and a GPGPU based processor as a co-processor that communicates with the application processor via a high-speed internal bus like AHB. As is illustrated, the application processor provides interface to the in-vehicle networks, external sensors, other ECUs, and/or gateways. Furthermore, the application processor can execute at least one of control algorithms, data aggregation from various sensors, and outsources computationally intensive applications (e.g., image, audio and video processing, cryptographic operations, etc.) to the GPGPU based co-processor. Further, symmetric cryptographic and fault tolerance primitives may be implemented within the GPGPU-based coprocessor to provide improved security and dependability features to the ECU.

In one embodiment, an automotive ECU is configured to encrypt data by applying an encryption scheme and a message authentication code (MAC) to the data. For example, the encryption scheme may be AES-128 encryption. Further, the MAC may be a SHA-3-based HMAC. However, in other embodiments, other encryption schemes and MACs may be implemented.

In various embodiments, the co-processor includes a cryptographic module with AES-128 encryption and SHA-3-based HMAC. In one embodiment, the co-processor may be a GPGPU including a plurality of cores that can batch one or more messages at once. For example, a co-processor may be configured to process eight 128-bit messages at once. The batch processing may enhance the throughput of the cryptographic module. Furthermore, the implementation in GPGPU exploits the largely byte-parallel operations of AES-128 and lane-parallel operations of SHA-3.

In various embodiments, parallel granularity of byte-per-thread for AES-128 may be implemented. In one embodiment, each byte of AES-128 may be mapped to a core of a GPGPU. For example, a core-block may have a number of cores equal to that of a word size used to compute a complete AES-128 encryption/decryption. In one embodiment, the core-blocks are executed in a single instruction multiple data (SIMD) fashion. For SHA-3, parallel granularity of 8-byte (a lane) per thread is used. In one embodiment, a core-block with 32 cores is used to compute complete SHA-3-based HMAC. Furthermore, in one or more embodiments, frequently accessed S-boxes, round constants, and other index constants used in AES-128 and SHA-3 may be stored in on the on-chip shared memory of the GPGPU to ensure fast memory access.

In various embodiments, an ECU includes a transmitter node and a receiver node. The transmitter node is configured to transmit communication messages between ECUs and the receiver node is configured to receive communication messages from other ECUs.

In one embodiment, one or more plaintexts (ECU messages) are processed at once at the transmitter node of an ECU. For example, eight plaintexts may be processed in parallel. In one embodiment, one processing core of the co-processor is used to implement an encryption scheme and one processing core of the co-processor is used to implement MAC. The grouping of two processing cores to implement encryption and implement MAC may be referred to as a core block. For example, for GPGPU having 32 processing cores, 16 core-blocks may be formed. Eight of these core-blocks can be used for AES-128 computation and eight can be used for HMAC computation. Each thread-block processes one ECU message. For example, AES-128 and HMAC may be computed in parallel core-blocks because they are independent operations.

In one embodiment, at the receiver node, MAC computation typically requires the output of decryption computation. Hence, at first, core-blocks can be launched to compute decryption to recover plaintexts of the ciphertexts received from the sender node. After decryption, core-blocks can be launched for MAC computation of the recovered plaintexts.

In one embodiment, resilience against soft errors occurring due to transient faults may be achieved by using redundant core-blocks. Each core-block, and its redundant counterpart, performs a complete encryption/decryption or MAC computation.

With reference to FIG. 3, for improved fault tolerance, eight ECU messages may be processed using 32 GPGPU core-blocks, where sixteen of these core-blocks are used for AES-128 and sixteen are used for HMAC computation. In each group of 16 core-blocks, eight are master core-blocks and eight are redundant core-blocks. Each master and redundant core-block pair processes one ECU message. The results obtained from the master and its redundant core-block are compared to detect computational errors. In one embodiment, the core-blocks are synchronized to compare the results. If computational errors (soft errors) are detected, then recomputation is conducted.

In addition to error resilience, fault tolerance provides resistance against a fault attack attempting to inject soft-errors in the operating ECUs.

Figure 4:
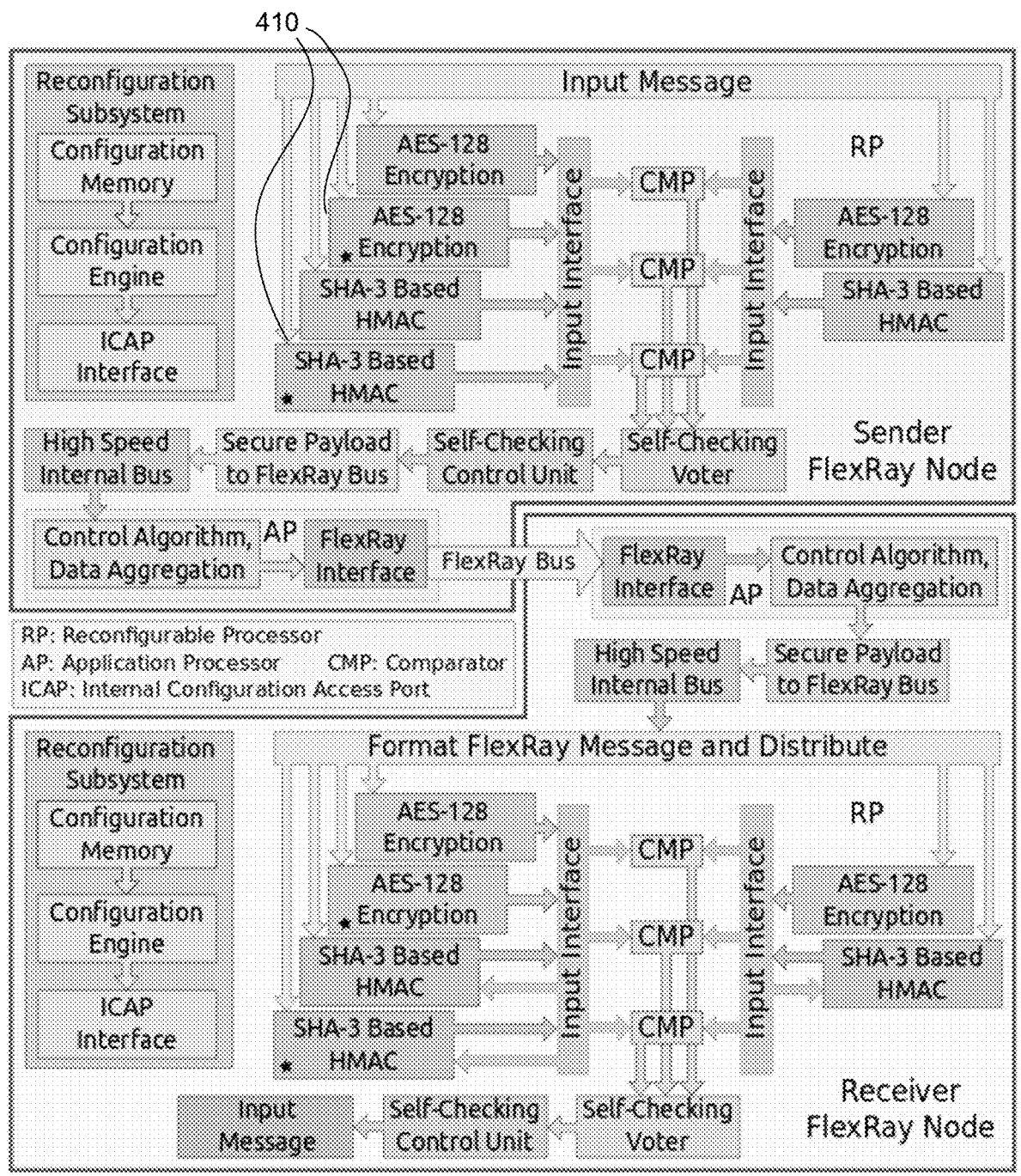
FIG. 4 illustrates a block diagram of an electronic control unit having a flexible architecture according to one or more embodiments of the disclosure.

FIG. 4 illustrates the high level architecture for a FPGA-based co-processor 400. The high-level architecture of co-processor 400 is similar to that of co-processor 300. In one embodiment, the ECU may include an ARM-based application processor as described above.

In one embodiment, the cryptographic module is implemented in an FPGA-based co-processor and provides three security services. The security services may include one or more of confidentiality, message integrity, and authentication services. The co-processor may be configured to compute encryption and MAC of an ECU message at the transmitter node. For example, a FPGA co-processor can be configured to compute AES encryption and HMAC of an ECU message at the transmitter node.

In one embodiment, the co-processor relays the concatenation of the ciphertext and the message digest to the application processor, which then transmits it to a receiver node via a communication bus. A receiver node on a second application processor may receive the communication and relay the received concatenation to its co-processor (e.g., an FGPA-based co-processor). The co-processor may be configured to decrypt the ciphertext to recover the original plaintext and then compute MAC of the plaintext to generate a local message digest. The local message digest can be compared with the received message digest to check the integrity of the received message. If the message has lost its integrity, then the message is retransmitted.

In one embodiment, a cryptographic module implemented within a FPGA co-processor is resilient to multiple transient faults and permanent faults. For example, fault tolerance may be provided by a combination of three methods. The first method may be dual modular redundancy (DMR) with an extra spare module (410 in FIG. 4). Further, a second mode may include Berger-code-based totally self-checking (TSC) combinational circuits. A third mode may include dynamic partial configurability of the co-processor.

In one embodiment, the fault tolerance is implemented through the use of self-reconfiguration in dual modular redundant system (FT-SR-DMR). In one embodiment, dual modular redundancy may be implemented to detect errors in computation. In other embodiments, the totally self-checking design method is employed as a combinational circuit that flags itself as erroneous in case of faults. In yet other embodiments, dynamic partial reconfiguration is exploited to heal faulty modules.

In various embodiments, at both sender and receiver nodes, AES and HMAC modules in dual modular redundancy computes ciphertext and message digest, respectively, from the ECU message. The results of redundant modules are compared by comparators in triple modular redundancy. In one embodiment, comparators are implemented in triple modular redundancy because the comparator circuit is simple and has a smaller footprint. Furthermore, in various embodiments, triple modular redundancy helps to localize the faulty comparator whenever there is fault in the comparator logic. In one embodiment, the results of comparators are checked by a Berger-code-based totally self-checking voter. The voter sends its voting result to a self-checking control unit (SCCU). The self-checking control unit generates the control signals for the cryptographic module and stores the result of recent AES and HMAC in a buffer memory. In one embodiment, when an error in AES (or HMAC) computation is detected, the self-checking control unit activates the spare AES (or HMAC) module. The spare module(s) then computes the results corresponding to the input for which there was an error. The results of the spare module are then compared with the results of regular AES (or HMAC) module that were stored in buffer to localize the faulty module. The self-checking control unit then activates the reconfiguration subsystem, which performs partial reconfiguration of the faulty module. The cryptographic module operates with the spare module(s) during the reconfiguration period. As the reconfiguration may take more time (in terms of tens of millisecond) than the cryptographic module needs to complete its task, the spare module is configured to function during this period to fulfill the security and dependability services.

Figure 5:
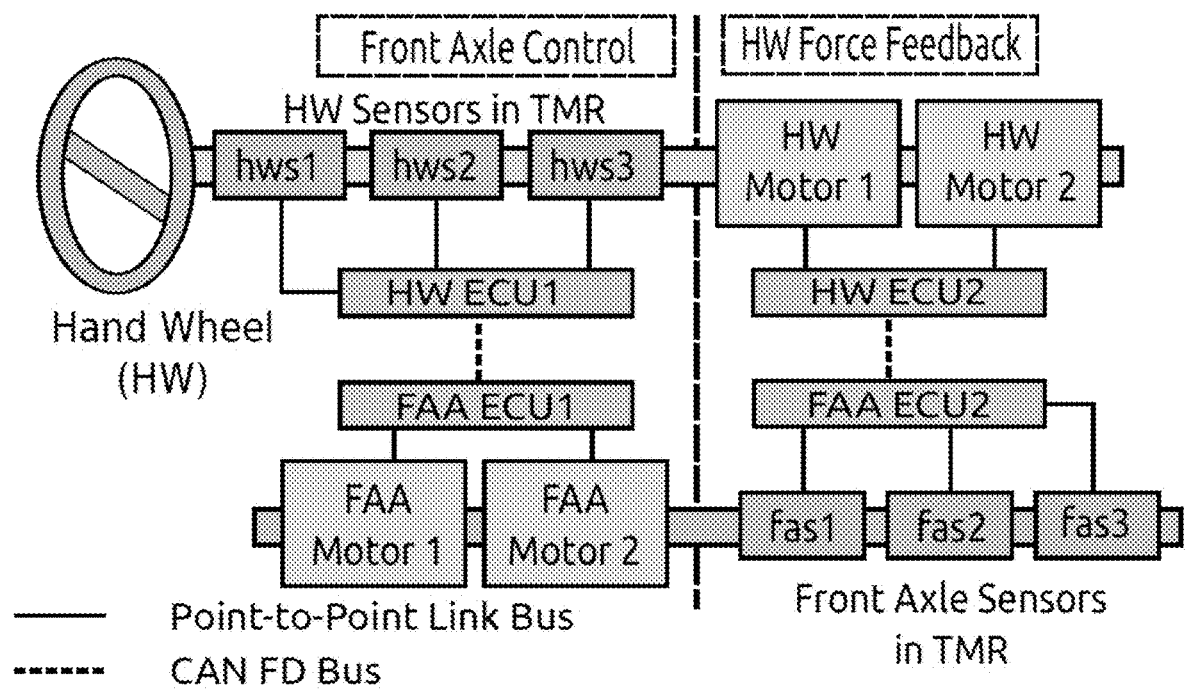
FIG. 5 illustrates a block diagram of a steer-by-wire subsystem according to one or more embodiments of the disclosure.
Figure 6:
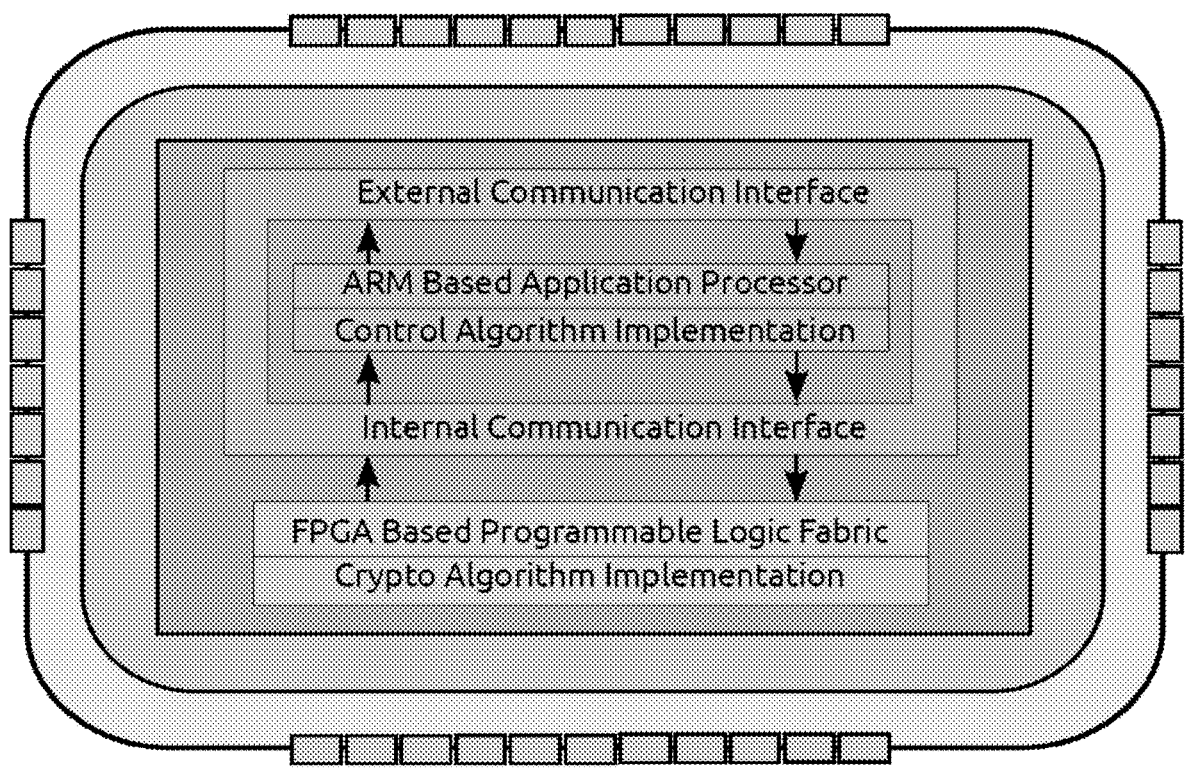
FIG. 6 depicts a high-level architecture of a proposed ECU according to one or more embodiments of the disclosure.

In a steer-by-wire subsystem, a heavy, mechanical steering column is substituted by electronic systems to reduce vehicle weight. This eliminates the risk of steering column entering into the cockpit in the event of a crash. The steer-by-wire subsystem provides the same functionalities as a conventional steering column. For example, the steering column provides front axle control (FAC) and hand-wheel (HW) force feedback. FIG. 5 illustrates an embodiment of a steer-by-wire system. In one embodiment, the steer-by-wire subsystem is made fault-tolerant by using redundant ECUs, sensors and actuators. Point-to-point links connect ECUs to sensors and ECUs to actuators. For ECU-to-ECU connection, Applicant experimented on all three commercial automotive buses: CAN, CAN FD and FLEXRAY®.

In one embodiment, the end-to-end delay/response time ($\tau_r$) is the delay between a driver's request at the hand wheel and the corresponding response at the front axle actuator. $\tau_r$ is regarded as a quality-of-service metric, but can also be interpreted as a dependability metric that impacts automotive safety and reliability if it exceeds a critical threshold value $\tau_r^{max}$, which is determined by automotive original equipment manufacturers (OEMs). Furthermore, the probability that the worst-case response time is less than the critical threshold is termed as behavioral reliability. The following analytically models the response time for the steer-by-wire subsystem and error resilience of the described fault-tolerant approaches.

Response time ($\tau_r$) is modeled as the sum of pure delay ($\delta_p$), mechatronic delay ($\delta_m$), and sensing delay ($\delta_s$), as, $\tau_r=\delta_p+\delta_m+\delta_s$. The mechatronic delay is introduced by the actuators. The sensing delay is the delay during the interaction of application processor of ECU with the sensors. The sensing and mechatronic delays are bounded by a constant value. For example, the delay may be 3.5 ms. For a secure and dependable approach, the pure delay ($\delta_p$) includes the ECUs' computational delay for processing the control algorithm, computational delay for processing the incorporated security and dependability primitives, and transmission delay including bus arbitration. Mathematically, pure delay ($\delta_p$) for the FAC function may be written as $$\delta_p = (rcc1 \cdot \delta_{h\omega}^{ecu1} + rtc \cdot \delta_{bus} + rcc2 \cdot \delta_{faa}^{ecu1}) \leq \delta_p^{max} \quad (1)$$

where $\delta_{h\omega}^{ecu1}$ and $\delta_{faa}^{ecu1}$ denote the computation time at HW-ECU1 and FAA-ECU1, respectively; $\delta_{bus}$ represents the transmission time for a message on an in-vehicle communication bus from HW-ECU1 to FAA-ECU1; rcc1 and rcc2 represent the number of precomputations that are needed to be done at HW-ECU1 and FAA-ECU1, respectively, to rectify soft errors; rtc represents the number of retransmissions required for an error-free transmission of a secure message over in-vehicle bus; and $\delta_p^{max}$ represents maximum allowable $\delta_p^{max}$. In one embodiment, the minimum tolerable QoS score and the critical limit for pure delay $\delta_p^{max}$ are set below where a vehicle become unstable and risks the safety of a driver of the vehicle. For example, the minimum tolerable QoS score may be 11.13 and the critical limit for pure delay $\delta_p^{max}$ may be 35 ms.

In various embodiments, $\delta_{h\omega}^{ecu1}$ and $\delta_{faa}^{ecu1}$ may be calculated as the sum of execution time of the application processor, execution time of the one or more co-processors, and the communication bus time. FIG. 2 illustrates AHB communication bus and ASB communication bus (shown as "a" and "b"). In one embodiment, as the co-processor executes the computationally intensive cryptographic primitives, the execution time of each co-processor is far greater than the sum of the bus times and execution times the application processor. In such an embodiment, the execution time of the co-processor is $\delta_{h\omega}^{ecu1}$ and $\delta_{faa}^{ecu1}$.

In one or more embodiments, an ECU including one or more co-processors having a plurality of cores is faster than conventional ECUs with regard to computing and transmitting secure dat. For example, ECUs including one or more co-processors having a plurality of cores is at least about 1.5 to about 1.8 times faster than conventional ECUs. Further, an ECU including one or more co-processors having a flexible, fault-tolerant architecture is faster than conventional ECUs with regard to computing and transmitting secure dat. For example, ECUs including one or more co-processors having a flexible, fault-tolerant architecture are at least 1.5 to about 1.8 times faster than conventional ECUs.

In various embodiments, ECUs including one or more co-processors having a plurality of cores or one or more co-processors having a flexible, fault-tolerant architecture exhibit increased timing performance as compared to conventional ECUs. For example, ECUs including one or more co-processors having a plurality of cores are at least to 25 to about 30 times faster than conventional ECUs. Further, ECUs including one or more co-processors having a flexible, fault-tolerant architecture are at least about 14 to about 16 times faster than conventional ECUs.

In various embodiments, ECUs including one or more co-processors having a plurality of cores or one or more co-processors having a flexible, fault-tolerant architecture have reduced power requirements as compared to conventional ECUs. For example, ECUs including one or more co-processors having a plurality of cores or one or more co-processors having a flexible, fault-tolerant architecture may use at least about 1.5 to about 2 times less power than conventional ECUs. Further, ECUs including one or more co-processors having a plurality of cores or one or more co-processors having a flexible, fault-tolerant architecture are more efficient than conventional ECUs. For example, ECUs including one or more co-processors having a plurality of cores or one or more co-processors having a flexible, fault-tolerant architecture may be at least about 1.4 to about 3.5 times more efficient than conventional ECUs.

In various embodiments, different communication buses may have different impacts on the automotive subsystems. For example, in a steer-by-wire system, CAN FD and FLEXRAY® buses provided reduced delay/response times as compared to a CAN communication bus. CAN FD was found to take at least 18.79 times less time than a CAN communication bus to deliver a 48-byte payload. Further, a FLEXRAY® bus was found to take at least 32.36 times less time than a CAN communication bus to deliver a 48-byte payload and 1.5 times less time than a CAN FD communication bus.

Additionally, a FLEXRAY® communication bus provides redundant communication channels, which can used to provide improved fault tolerance.

ECUs including one or more co-processors having a plurality of cores or one or more co-processors having a flexible, fault-tolerant architecture were found to provide at least 3.8 or 2.5 times (respectively) better response times than conventional ECUs. Furthermore, ECUs including one or more co-processors having a plurality of cores or one or more co-processors having a flexible, fault-tolerant architecture were found to tolerate an increased number of faults as compared to conventional designs. For example, ECUs including one or more co-processors having a plurality of cores or one or more co-processors having a flexible, fault-tolerant architecture were found to tolerate more than 3000 faults (about 14 to 27 times more faults) than conventional ECUs.

Working Example

Secure and Dependable Approach for Cybercar Design
Security

Figure 9:
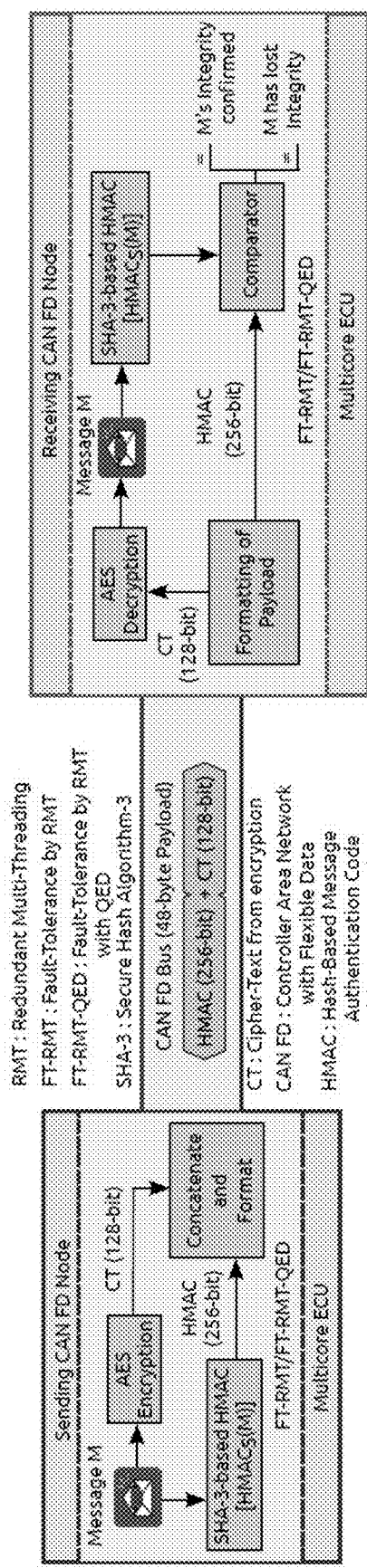
FIG. 9 depicts a secure and dependable approach for a cybercar design according to one or more embodiments of the disclosure.

FIG. 9 depicts another embodiment of an "encrypt-and-MAC" architecture. Encrypt-and-MAC provides comparable security to MAC-then-encrypt; however, encrypt-and-MAC requires less computation time and computation overhead than MAC-then-encrypt. Embodiments of the invention utilize SHA-3-based HMAC. Furthermore, the architecture can be made resistant to masquerade and reply attack by embedding a 64-bit counter value to the original message. The input to the AES and HMAC module can be a 128-bit message where first 64-bit is the original message and the second 64-bit is the counter value.

Referring still to FIG. 9, this embodiment requires only one HMAC computation and one AES-128 encryption of the original message. In this "encrypt-and-MAC" approach, the HMAC of message is not encrypted because the HMAC is collision-resistant and is computed with a secure secret key that is only known to legitimate sender and receiver nodes. The output of the HMAC computation (256-bit message digest) and the AES-128 encryption (128-bit ciphertext) can be concatenated to generate a 384-bit (48-bytes) message. The sending nodes can then transmit the 384-bit concatenated message to the receiver node via the CAN FD bus. The payload size of the CAN FD bus can be 64 bytes, so it is able to transfer 48 bytes of the message in one cycle. Hence, the enhanced approach saves two AES-128 computations at the sender node and speeds up CAN data transfer by 6×.

Equation 2 summarizes the time taken by the operations at the sender CAN FD node to append the security primitives to the message and Equation 3 outlines the time at receiver CAN FD node to regenerate the original message and check the integrity of the received message.

$$T_{(M\|C)}^S = T_{HMAC[(M\|C),K_1]} + T_{E[(M\|C),K_2]} + T_{format} \quad (2)$$

where C represents the count of 64-bit counter, $T_{(M\|C)}^S$ represents the time taken at sender CAN FD node to add security primitives to message (M∥C); $T_{HMAC[(M\|C),K_1]}$ denotes time taken to compute HMAC of message (M∥C) using secret key $K_1$; $T_{E[(M\|C),K_2]}$ designates the time to compute AES encryption of message (M∥C) using secret key $K_2$; and $T_{format}$ denotes the time to concatenate and formatting the sending CAN FD node message.

$$T_{(CT\|MAC)}^R = T_{format} + T_{D[CT,K_2]} + T_{HMAC[(M\|C),K_1]} + T_{cmp} \quad (3)$$

where $T_{(CT\|MAC)}^R$ designates the time taken to recover the original message from the received message at receiver node; $T_{format}$ denotes the time to format the received CAN FD payload; $T_{D[CT,K_2]}$ denotes the time to perform AES decryption of ciphertext CT using secret key $K_2$; $T_{HMAC[(M\|C),K_1]}$ represents time to compute HMAC of the decrypted ciphertext CT (or (M∥C)) using secret key $K_1$; and $T_{cmp}$ designates time to compare the HMAC calculated from the decrypted ciphertext and received HMAC from payload.

Dependability

Embodiments of the invention use fault tolerance (FT) as an avenue to provide dependability to the automotive system. The FT approach can provide error detection and correction for dependability. Embodiments of the invention can utilize FT by redundant multi-threading (FT-RMT) and/or FT by redundant multi-threading for quick error detection (FT-RMT-QED). Both the FT approaches can leverage RMT on a dual-core architecture. RMT uses two threads, a master thread and a normal thread, to execute the same safety-critical computation. At the end of the computation, the results obtained from two threads are compared to detect an error in the calculation. If there is an error, then recomputation is carried out on both threads to expunge the computation error. Recomputation usually rectifies errors because soft errors, which are caused by transient faults, constitute a majority of errors in the computation. FT-RMT-QED enhances FT-RMT with QED by inserting check instructions at different points in the master thread. When an error is detected earlier by FT-RMT-QED rather than at the end of the computation, the erroneous computation is aborted, and the computation is restarted to obtain an error-free result. These FT techniques can tolerate one permanent fault and multiple soft errors (by recomputations), and therefore adheres to the requirement of ISO 26262 standard.

Baseline Design Code Optimization

Several efficient software implementations of AES-128 and SHA-3 exist. Because the implementation is targeted for 32-bit ARM platform, strategies like loop-unrolling, cache-aware programming, alignment of data structures to cache line boundaries in memory, use of 32-bit data type only, and all of the efficient coding strategies are accommodated by embodiments of the invention. This yielded considerable improvements in the execution time of the OBD.

Proposed Secure and Dependable ECU Architecture

Architecture Overview

To overcome the security and dependability limitations of existing automotive ECUs, embodiments of the invention propose a novel ECU architecture that provides a more robust and flexible security and dependability solution. FIG. 10 provides an overview of a proposed ECU architecture. The ECU architecture includes two programmable parts: an ARM®-based application processor or real-time processor (AP/RTP) and a field-programmable gate array (FPGA)-based programmable logic fabric (PLF). The AP/RTP implements the automotive function's (e.g., SBW) control algorithms. The type of AP/RTP used varies based on the automotive function and the corresponding control algorithm to be executed. The FPGA-based PLF implements cryptographic functionality (i.e., cryptographic algorithms and protocols) for secure on-board communication and authentication. The AP/RTP and the PLF are connected by a high-speed communication interface.

Figure 7:
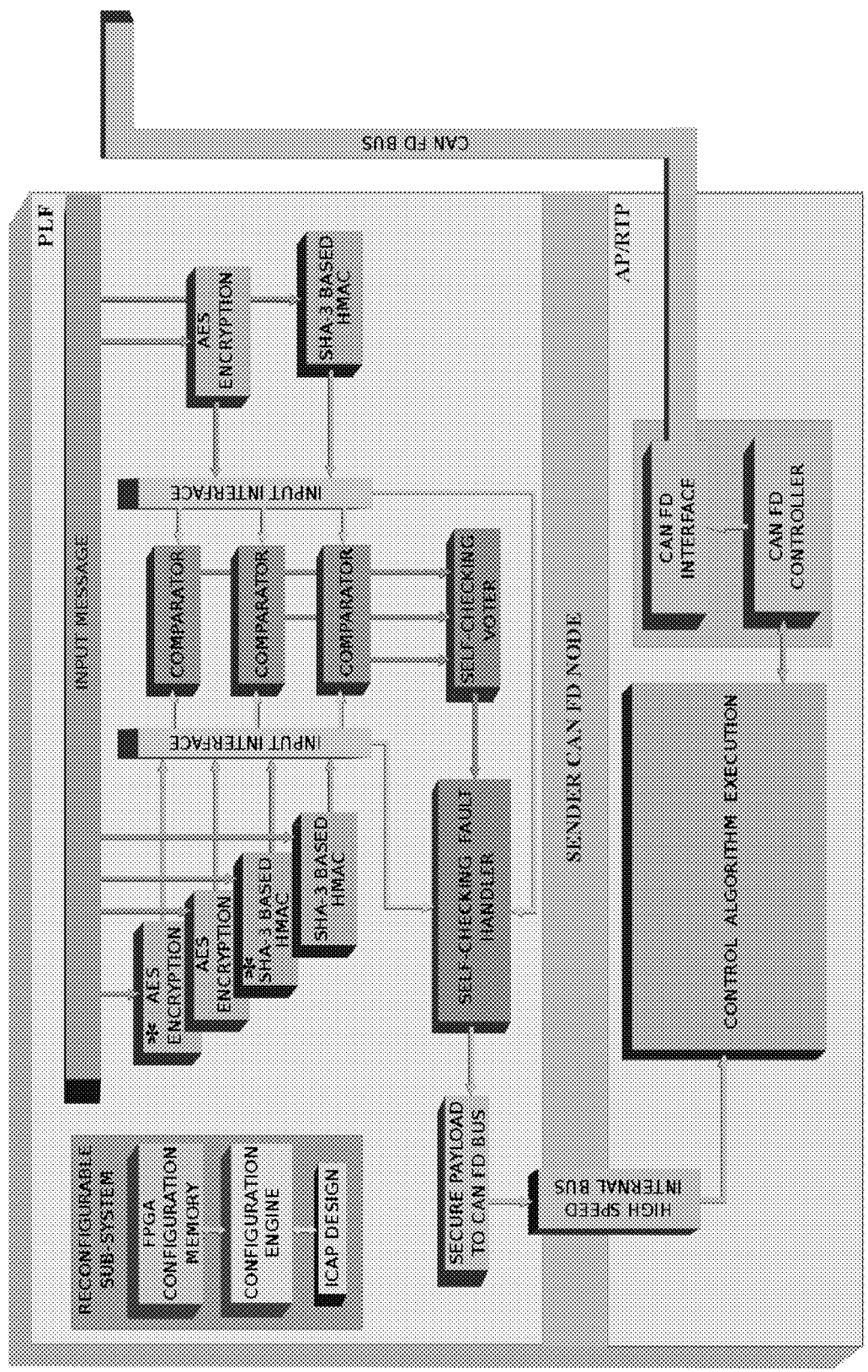
FIG. 7 depicts a sender node during non-faulty operation according to one or more embodiments of the disclosure.
Figure 8:
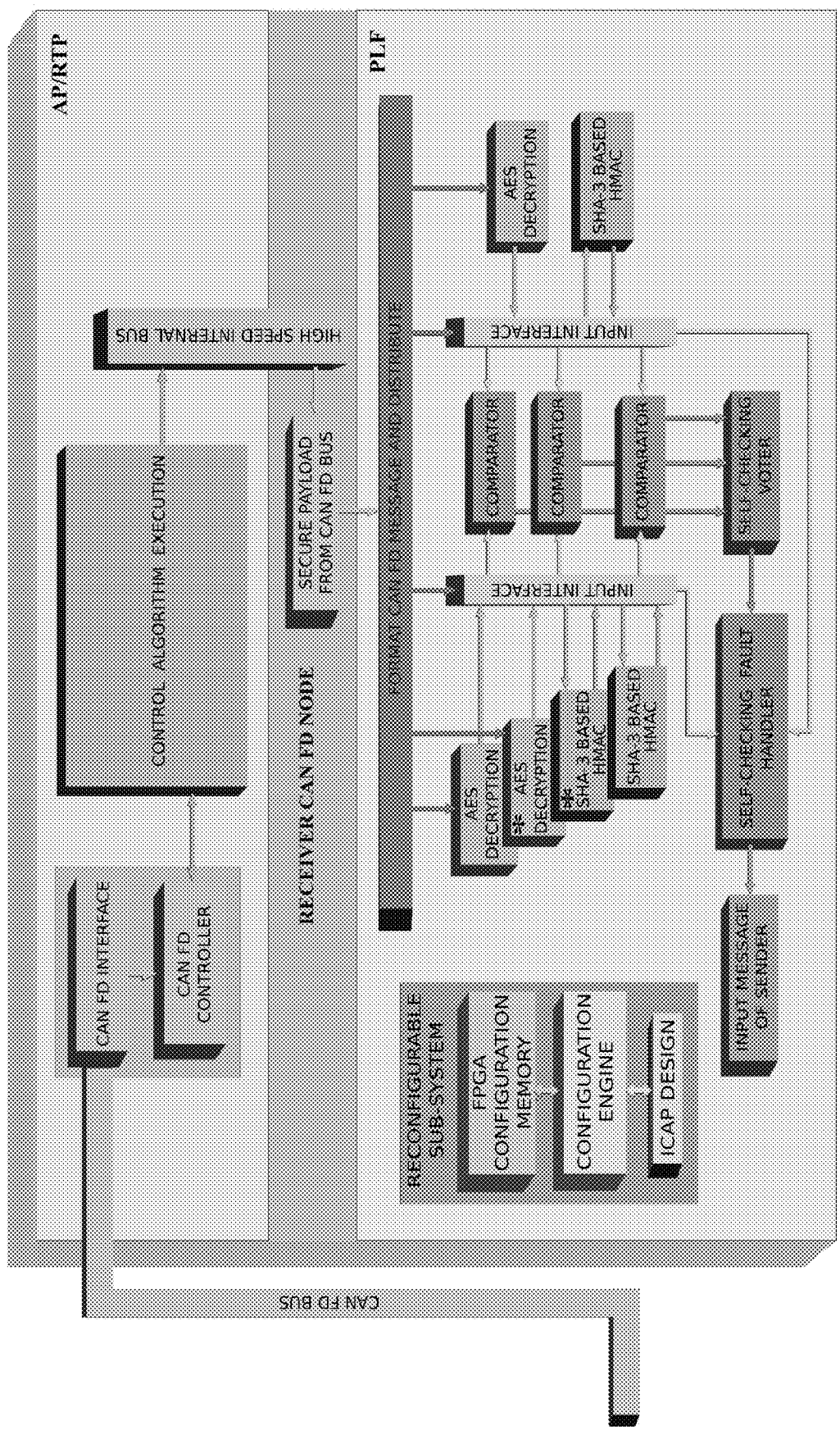
FIG. 8 depicts a receiver node during non-faulty operation according to one or more embodiments of the disclosure.

This ECU architecture provides a multitude of benefits. First, the PLF implements an FT cryptographic module (CM) as shown in FIGS. 7 and 8. The FT is realized by using dynamic partial self-reconfiguration. Second, the PLF is a suitable platform for implementing real-time constrained compute-intensive algorithms, such as audio, video, and image processing algorithms. The PLF can be extended to implement these compute-intensive algorithms without incurring extra cost. To add new applications on top of the CM, the designer simply needs to write a hardware descriptive language (HDL) module for the new application, and then embed this module with the CM by modifying the bitstream in the PLF. Third, the internal communication interface between the ECU's AP/RTP and PLF is inherently secure because the AP/RTP and the PLF are connected by the internal bus, which is not accessible to an attacker.

ECU Operation

At the sender node, during non-faulty state, the input message can be read by two AES encryption and two SHA-3-based HMAC modules depicted in FIG. 7. The spare modules (designated by * in FIG. 7) do not read the input message because the spare modules are disabled by the self-checking fault handler (SCFH) module. The outputs of the two AES encryption and the two SHA-3 based HMAC modules can be fed to two input interfaces, which route these outputs to the comparators in triple modular redundancy (TMR). The comparators generate the comparison outputs and provide them to the self-checking voter (SCV). The SCV is a majority voter, which is designed based on Berger-code-based TSC. In case of a fault, the SCV can flag itself as a faulty unit to the SCFH. The output of the SCV is then passed to the SCFH. The SCFH generates all the necessary control signals for the operation of the FT CM (omitted in figure for clarity). Additionally, SCFH has a small buffer that stores the results of recent computations of all the modules in the FT CM.

If there is no error in the AES and HMAC computations, then the SCFH can concatenate the HMAC to the AES encrypted message and send the concatenated amalgam to the AP/RTP via a high-speed internal bus, which then transmits the message to the receiver ECU through CAN FD bus. If there is a fault in AES and/or HMAC computation, then the fault detection and recovery can be performed by Algorithm 1.

Algorithm 1 - Fault Recovery in Proposed ECU

```
Input: modules in DMR M₁, M₂ and spare module M_S
Output: reconfiguration of faulty module(s)
Data: count = 1, NUMSOFTERR = x
 1     if (Op(M₁) ≠ Op(M₂)) then
                // Op(Mᵢ) : output of module Mᵢ
 2         count ← count + 1
           RecomputeAESHMAC(M₁, M₂, previousInputs)
 3         if (count ≤ NUMSOFTERR) then
 4             Goto Line 1
 5         else
 6             Goto Line 10
 7     else
 8         Concatenate(cipherText, messageDigest)
 9         SwitchMode(NonFaulty)
10         DeactivateModule(M₁, M₂)
11         ActivateModule(M_S)
12         ComputeAESHMAC(M_S)
13         if (Op(M_S) ≠ Op(M₁) && Op(M_S) = Op(M₂)) then
14             faultyModule ← M₁
15             ActivateModule(M₂)
16             ReconfigureModule(M₁)
17             SwitchMode(NonFaulty)
18         if (Op(M_S) ≠ Op(M₂) && Op(M_S) = Op(M₁)) then
19             faultyModule ← M₂
20             ActivateModule(M₁)
21             ReconfigureModule(M₂)
22             SwitchMode(NonFaulty)
23         if (Op(M_S) ≠ Op(M₁) && Op(M_S) ≠ Op(M₂)) then
24             faultyModule ← M₁ and M₂
25             ReconfigureModule(M₁, M₂)
26             SwitchMode(NonFaulty)
```

Algorithm 1 takes the input as modules in dual modular redundancy (DMR) and a spare module. The modules in DMR $M_1$ and $M_2$ can be operational during non-faulty state while spare module MS is operational during faulty state. The output of the algorithm would be the successful reconfiguration of faulty modules. First, to detect an error in computation, the outputs of the two modules in DMR can be compared.

If there is mismatch in the output, recomputation can be performed in both the modules using previous input for which there was an error. If the recomputation yields same output in two modules, the ciphertext produced by AES encryption module and message digest produced by SHA-3-based HMAC module can be concatenated and sent to another CAN FD node. The Cryptographic Module (CM) can return to non-faulty mode. However, if the first recomputation does not correct the error, the algorithm continues up to NUMSOFTERR recomputations where NUMSOFTERR is the number of soft errors that our FT design can tolerate. NUMSOFTERR can be computed using Equation 8. If recomputations fail to rectify the fault, both of the suspected faulty modules can be deactivated, and the spare module can be activated because it is not possible with DMR to discern which of the two suspected faulty modules is actually faulty.

Lines 13 to 30 in Algorithm 1 show the localization and fault recovery of the faulty modules. Here, the spare module computes AES and HMAC with the previous input and the result is routed to the SCFH via the input interface. The SCFH compares this new output with the output in buffer from the previous computation to identify the faulty module. Finally, the SCFH signals the reconfiguration subsystem to partially reconfigure the faulty module. If both of the modules in the DMR configuration are faulty, then both modules can be reconfigured while the system continues operation with the spare module until the reconfiguration is completed. However, if only one of the modules is faulty in the original DMR configuration, then the non-faulty and the spare module can start operating in DMR. The rationale for using the spare module in the new DMR configuration is that the reconfiguration takes longer time (in order of tens of millisecond) and the CM should be functional during that reconfiguration period for fulfilling the security and dependability requirements of automotive CPS. Equation 4 gives the time taken to embed the security primitive to the CAN FD message at the sender node during the non-faulty state of operation.

$$T_{(M\|C)}{}^S = T_{cmp} + T_{SCV}{}^S + T_{SCFH}{}^S + \vee (T_{HMAC[(M\|C),K_1]}, T_{E[(M\|C),K_2]}) \quad (4)$$

C represents the count of the 64-bit counter, (M‖C) represents the concatenation of message and 64-bit counter value, $V(\ldots,\ldots)$ represents a function that selects the larger of two execution times, $T_{HMAC[(M\|C),K_1]}$ represents the time to compute HMAC of message (M‖C), $T_{E[(M\|C),K_2]}$ designates the time to compute AES of message (M‖C), $T_{cmp}$ designates the time to compare the outputs of redundant AES and HAMC computation modules, $T_{SCV}{}^S$ represents the time to present voting decision by self-checking voter to self-checking fault handler, and $T_{SCFH}{}^S$ designates the time to check the voting decision of SCV and to format the CAN FD message such that it is ready to send to the AP/RTP.

The worst-case time for embedding the security attribute to the CAN FD message is presented in Equation 5. This is the sum of time to detect the error in computation plus time to recompute the results using spare modules plus time to locate the fault. The time to detect error in computation is given by Equation 4. The time to recompute the results using spare modules is given by the $V(\ldots)$ term in Equation 5, and the time to locate the fault is the execution time of SCV and SCFH.

$$T_{(M\|C)}{}^{SWC} = T_{(M\|C)}{}^S + T_{SCFH^*}{}^S + \vee (T_{HMAC[(M\|C),K_1]}{}^*, T_{E[(M\|C),K_2]}{}^*) \quad (5)$$

where $T_{(M\|C)}{}^{SWC}$ represents the worst case time to attach the security features in (M‖C), $T_{(M\|C)}{}^S$ represents the time to incorporate security feature during non-faulty operation, which can be considered as the time to detect the computation error, and $T_{SCFH^*}{}^S$ designates the time to locate the fault and time to activate the reconfiguration subsystem by SCFH.

At the receiver node, first, the CAN FD message can be formatted to separate the AES ciphertext and the HMAC. Then, the ciphertext can be decrypted by the AES decryption module to generate the original message. The original message can be sent to the HMAC computing module and to the comparators via the input interface. The three comparators can independently compare the AES decryption results and the outputs of the comparators can be fed to the SCV, which then can communicate its decision to the SCFH. During the operation of the comparators and the SCV, the SHA-3-based HMAC module generates the local HMAC in parallel. Because the comparators and the SCV are faster than the SHA-3-based HMAC module by orders of magnitude, correctness check for AES decryption and local HMAC calculation can be performed in parallel without any conflict. However, this parallel operation incurs some additional signaling overhead on the SCFH. If there is no error in the AES decryption, then correctness of local HMAC can be assessed after the local HMAC calculation. The FT operation to heal the faulty module can be similar at both the sender and the receiver nodes.

Equation 6 represents the time for the receiver to recover the original message with integrity checking. This time is the sum of time to format the received CAN FD message, time to generate the original message sent by sender node, and time to check the integrity of the message by recomputing the HMAC of the recovered original message and comparing the received HMAC with the recently computed HMAC.

$$T_{(CT\|MAC)}^R = T_{format} + T_{D[CT,K_2]} + T_{HMAC[(M\|C),K_1]} + \sum_{j=1}^{2} \{T_{cmp}^j - T_{SCV}^j + T_{SCFH}^j\} \quad (6)$$

where $T_{format}$ is the time to separate the received CAN FD message into the ciphertext CT and MAC; $T_{D[CT,K_2]}$ is the time to decrypt the ciphertext CT using secret key $K_2$; $T_{HMAC[(M\|C),K_1]}$ designates the time to compute the HMAC of the decrypted cyphertext; and $T_{cmp}$, $T_{SCV}$, and $T_{SCFH}$ represent the time taken by comparators, SCV, and SCFH respectively. Comparator, SCV, and SCFH execution times are added twice—one for the AES decryption and another for HMAC computation—because AES computation and HMAC computation happens twice.

The worst-case time to recover the original message with integrity checking at the receiver node is given by Equation 7.

$$T_{(CT\|MAC)}^{RWC} = T_{(CT\|MAC)}^R T_{D[CT,K_2]}^* + T_{HMAC[(M\|C),K_1]}^* + \sum_{j=1}^{2}\{T_{cmp}^j - T_{SCV}^j\} + \sum_{k=1}^{3}\{T_{SCFH}^k\} \quad (7)$$

where $T_{D[CT,K_2]}^*$ is the time to compute the AES decryption by spare module after the error is detected; $T_{HMAC[(M\|C),K_1]}^*$ is time to compute HMAC from the decrypted ciphertext; and $T_{cmp}$, $T_{SCV}$, and $T_{SCFH}$ are respectively the time taken by comparators, SCV, and SCFH. The execution time for comparator and SCV are added twice because the comparators and SCV operate before the fault is detected (or during non-faulty operation). This is similar to the non-faulty operation represented by Equation 6. However, after the fault, spare modules are the only functional modules and during this time the comparators and SCV are not operating. Meanwhile, SCFH is operating before and after the fault is detected. So, the execution time of SCFH is added three times.

Dependability

The automotive systems dependability requirements stipulated by ISO-26262 can be met by designing a FT CM. The dependability features of the FT CM in Applicant's design FIGS. 7 and 8 include: dual modular redundancy (DMR) with an extra spare module (marked by * in FIGS. 7 and 8); Berger-code-based totally-self-checking combinational circuit (TSC); and (3) the partial reconfiguration feature of the XILINX® AUTOMOTIVE™ (XA™) SPARTAN®-6 FPGA.

The first FT attribute of this embodiment is DMR. DMR is a FT technique that uses two redundant modules, which enables it to detect a computation error by comparing the outputs of the two modules. However, one potential shortcoming of DMR is that it cannot identify the faulty module among the two operating modules. In order to resolve this issue, an embodiment of the ECU uses a spare module that is activated only during the faulty state to detect the faulty module(s). The activation of the spare modules only during fault helps the system to improve energy efficiency. The fault detection and recovery is shown in Algorithm 1 and is thoroughly explained in the "ECU Operation" subsection herein.

The second FT feature that can be incorporated in the proposed ECU is TSC. TSCs are the class of circuits in which occurrence of fault can be detected by observing the output of the circuit. A TSC can include of a functional circuit, whose output words belong to a certain code (Berger code in one embodiment), and a checker that monitors the output of the functional circuit to detect the fault in the circuit. The reliability of the circuit depends on the ability if its checker to behave correctly despite the possible occurrence of internal fault.

A third FT feature incorporated for fault recovery is partial reconfiguration of PLF. A proposed ECU architecture heals the faulty modules by exploiting partial reconfiguration (PR) technology as discussed below. Reconfigurability means the capability of programmable hardware devices, such as FPGA, to change customized design by loading different bitstreams. A more advanced reconfiguration technology is PR where a subset of FPGA operational logic is modified by downloading a partial configuration file/bitstream. Typically, PR is achieved by overwriting the current design in the FPGA configuration memory with the partial bitstream of the new design. XILINX® FPGAs provide a dedicated internal configuration access port (ICAP) that directly interfaces to the configuration memory and accesses it. Embodiments of the invention use LOGICORE® IP XPS HWICAP to perform dynamic partial reconfiguration. The XPS HWICAP IP enables a MICROBLAZE™ processor as a configuration engine to read and write the FPGA configuration memory through the ICAP at run time and perform the partial reconfiguration.

Security

Embodiments of the invention provide three security services: message confidentiality, message integrity, and ECU authentication. Embodiments leverage AES-128 (128-bit) encryption to provide confidentiality and SHA-3-based HMAC for authentication and message integrity. This approach assumes that initial AES and HMAC keys are stored in secure tamper-resistant memories of ECUs by original equipment manufacturers (OEMs). Moreover, these keys are refreshed deterministically over time by the participating ECUs. This security approach is resilient against passive attacks because a passive adversary may eavesdrop on traffic, but the adversary cannot decrypt the message without the knowledge of the secret key. This approach utterly extinguishes active attacks because SHA-3-based HMAC with a 128-bit counter value embedded in the ciphertext of message prevents the insertion of forged messages, prohibits message modification, and also precludes the masquerade and replay attacks. This is possible because there are no known brute-force and analytical attacks against AES and SHA-3-based HMAC computations.

Steer-by-Wire (SBW) Systems

A SBW system is one in which the heavy mechanical steering column is replaced by an electronic system, which reduces the vehicle weight and eliminates the risk of steering column entering into the cockpit in the event of a car crash. However, these benefits come with the stringent real-time performance and reliability requirements for SBW system. This section describes an SBW system that leverage multi-core ECUs to incorporate security and dependability primitives.

Steer-by-Wire Operational Architecture

In order to successfully replace the conventional steering column, a SBW system needs to provide two main services: front axle control (FAC) and hand-wheel (HW) force feedback (HWF). FIG. 5 depicts the SBW architecture used in this study. This study focuses only on front axle control to compute the response time and error resilience of Applicant's FT approaches.

Redundancy at ECU-, sensor-, and actuator-level provides FT in the SBW system. The sensors are connected to ECUs via point-to-point link while ECU-to-ECU communication is accomplished via CAN FD bus. This SBW system leverages the proposed ECU architecture and the ECU-to-ECU communication is carried out via CAN FD bus to enable high-speed data transfer.

QoS and Behavioral Reliability

The delay between the driver's request at HW and the response at FAA has significant impact on the reliability of SBW system. This end-to-end delay/response time ($T_{res}$) is regarded as QoS that impacts safety and availability if it exceeds a critical threshold value, $T_{max}$. This $T_{max}$ is determined by automotive OEMs. The probability that the worst-case response time is less than the critical threshold is termed as behavioral reliability. The response time, $T_{res}$, is subject to variation because of various vehicular operational aspects. The impact of this variation on vehicle's performance and stability can be measured in terms of QoS score, S. In fact, there exists a linear relationship between S and $T_{res}$ for instantaneous rotation of HW. With a minimum tolerable S of 11.13, the critical limit $T_{max}$ for the response time is 11.5 ms, beyond which the vehicle becomes unstable and the safety of the driver can be at risk.

Applicant analytically modeled the response time and the error resilience provided by this exemplary FT approach for the SBW system subject to implicit timing constraints imposed by behavioral reliability. Applicant considered the FAA portion of the SBW for analytical modeling. The end-to-end delay/response time is modeled as the sum of pure delay ($D_p$), mechatronic delay ($D_{mech}$), and sensing delay ($D_{sens}$), as $T_{res}=D+D_{mech}+D_{sens}$. Further, the pure delay includes the ECUs' computational delay for processing the control algorithm and transmission delay including bus arbitration. For Applicant's secure and dependable architecture, pure delay also includes computation delay of the security and dependability primitives processing. Because $D_{mech}$ and $D_{sens}$ can be upper bounded by a constant value (3.5 ms according to K. Klobedanz et al., "Timing modeling and analysis for autosar-based software development—a case study," in IEEE/ACM DATE 642-45 (March 2010)), Applicant focused on pure delay for reliability and error resilience analysis. The pure delay has the critical limit ($D_p^{max}$) of 8 ms corresponding to $T_{max}$ of 11.5 ms. The behavioral reliability can be modeled as $P_{BR}=P[D_p^{wc}<D_p^{max}]$, where $D_p^{wc}$ is the worst case $D_p$ and $P_{BR}$ is the behavioral reliability. Finally, pure delay function for Applicant's FAC function can be written as $D_p^{FAA}=D_{hw}^{ecul}+D_{canfd}^{channel}+D_{faa}^{ecul}$, where $D_{hw}^{ecul}$ and $D_{faa}^{ecul}$ denote the computation time at HW-ECU1 and FAA-ECU1, respectively. $D_{canfd}^{channel}$ represents the time that CAN FD bus takes to transport message from HW-ECU1 to FAA-ECU2. Worst-case $D_p^{wc}$ can be modeled as $$(D_p^{wc}=rcc1 \cdot D_{hw}^{ecul}+rtc \cdot D_{canfd}^{channel}+rcc2 \cdot D_{faa}^{ecul}) \leq D_p^{max} \quad (8)$$

∀ rcc1, rcc2, rtc∈$Z^+$, where rcc1 and rcc2 represent the number of recomputations needed at HW-ECU1 and FAA-ECU1, respectively, and rtc represents the number of retransmissions needed for error-free sending of secure message over CAN FD bus. Because the two ECUs, HW-ECU1 and FAA-ECU1 are placed at different parts of the vehicle, they suffer from different types of hazards. Two counters, rcc1 and rcc2 count the number of recomputations needed at the two ECUs. Equation 8 analyzes the number of recomputations and retransmissions that are allowed without violating the QoS and behavioral reliability requirement. These equations are used in the "Evaluation Results" subsection herein to compute pure delay and number of maximum tolerable errors.

Results

Experimental Setup

Multicore-Based ECU Design Implementation

Applicant implemented both the implement both the Baseline Design (BD) described in A. Munir & F. Koushanfar, "Design and performance analysis of secure and dependable cybercars: A steer-by-wire case study," in 2016 13th IEEE Annual Consumer Communications Networking Conference 1066-73 (January 2016) and the embodiment described in this Working Example and referred to herein as the Optimized BD (OBD) on an NXP® quad-core iMX6Q SABRE development board which has CORTEX®-A9 CPU core. The 32-bit CORTEX®-A9 processor runs the UBUNTU® 14.04.4 LTS operating system at 396 MHz clock speed. The security primitives are coded in C. The OPENMP® API is used to provide RMT-based FT on the multicore architecture. The OBD exploits efficient coding strategies for a 32-bit ARM® platform, such as loop-unrolling and cache-aware programming to attain better performance.

Proposed ECU Design Implementation

The proposed ECU architecture has both the AP/RTP and the PLF. Applicant implemented the security primitives in the PLF, which is realized by automotive grade SPARTAN®-6 FPGA. The overall secure and dependable system/ approach depicted in FIGS. 7 and 8 as well as each of the individual security modules were coded in Verilog HDL in XILINX® ISE 14.7 and the functional verification was performed using MODELSIM® software. Further, post-place and route simulation model were generated using ISE 14.7 software. Applicant ran the simulation model in MODELSIM® software to measure the execution time. Applicant used this procedure to obtain an accurate estimation of real-world execution time on the board. The total power consumption (both static and dynamic) was obtained using the XPower Analyzer package distributed with the XILINX® ISE 14.7 software. Applicant used the power and execution time values to compute the energy consumed by the FT security module.

VECTOR CANOE™-Based Setup

Applicant simulate the SBW system in VECTOR CANOE™ 8.5 available at https://vector.com/vi_canoe_en.html with CAN FD bus set to 48-byte payload, 1 Mbps arbitration-phase baud rate and 3 Mbps data-phase baud rate. Applicant used CAPL (CAN Access Programming Language) to implement the SBW functions on ECUs.

Operational Parameters

Applicant assumed the steering wheel sensor sampling rate to be fixed at 420 Hz, i.e., $T_{sens}$=2.38 ms. For multicore-based SBW, the ECU operates at 396 MHz clock. The operational current is calculated as 36 mA and the operational voltage as 1.42 V. For the proposed ECU architecture, the PLF, SPARTAN®-6-XA FPGA, operates in 50 MHz clock while running the CM.

Evaluation Results
Timing Analysis

The timing analysis for the FT approaches was performed by injecting soft errors at different points in the security module code for both BD and OBD. Table 1 shows the timing performance of BD, OBD, and EAF. The results show that for NFT operational mode, OBD was 1.36× and 1.27× times faster than BD at the sender and receiver nodes, respectively. Results reveal that for FT-RMT, OBD has a speedup of 1.98× and 1.97× over BD at sender and receiver nodes, respectively. Finally, for FT-RMT-QED mode, OBD attains a speedup of 1.88× and 1.67× over BD at sender and receiver nodes, respectively.

than BD with FT-RMT-QED. Similarly, at the receiver node, EAF with FT-SR-DMR was 1.89× more energy efficient than BD with FT-RMT, and 2.34× more energy efficient than BD with FT-RMT-QED.

The comparison between EAF and OBD divulges that NFT EAF resulted in 4.45× and 2.35× times more energy savings than NFT OBD at sender and receiver nodes, respectively. Additionally, at the sender node, EAF with FT-SR-DMR engendered 1.59× more energy savings than OBD with FT-RMT, and 2.4× times more energy savings than OBD with FT-RMT-QED, respectively. At the receiver node, EAF with FT-SR-DMR consumed 1.04× times more energy than OBD with FT-RMT. This is because FT-SR-

TABLE 1

Performance and energy results for BD, OBD, and EAF

| | | BD | | | OBD | | | FPGA Implementation (EAF) | | |
|---|---|---|---|---|---|---|---|---|---|---|
| CAN FD Node | Operational Mode | FT Mode | Time (μs) | Energy (μs) | FT Mode | Time (μs) | Energy (μs) | FT Mode | Time (μs) | Energy (μs) |
| Sensor Node | NFT | x | 257 | 13.137 | x | 189 | 9.661 | x | 4.90 | 2.170 |
| | FT | FT-RMT | 411 | 21.010 | FT-RMT | 207 | 10.581 | FT-SR-DMR | 6.53 | 6.647 |
| | | FT-RMT-QED | 589 | 30.109 | FT-RMT-QED | 313 | 16.000 | | | |
| Receiver Node | NFT | x | 235 | 12.013 | x | 184 | 9.406 | x | 9.00 | 3.996 |
| | FT | FT-RMT | 401 | 20.499 | FT-RMT | 203 | 10.377 | FT-SR-DMR | 10.63 | 10.831 |
| | | FT-RMT-QED | 497 | 25.406 | FT-RMT-QED | 297 | 15.182 | | | |

Comparison of BD and EAF reveals that NFT EAF is 52.45× and 26.11× times faster than NFT BD at the sender and receiver nodes, respectively. Furthermore, after embedding FT in BD by FT-RMT and in FPGA by FT-SR-DMR (fault tolerance using self-reconfiguration in DMR), EAF is 62.94× and 37.72× times superior than BD at the sender and receiver nodes, respectively. Lastly, EAF with FT-SR-DMR provides a speedup of 90.19× and 46.75× at sender and receiver nodes, respectively, over BD in FT-RMT-QED mode.

Comparison of EAF and OBD shows that NFT EAF is faster than NFT OBD by 38.57× and 20.44× times at sender and receiver nodes, respectively. Moreover, FT-SR-DMR in EAF surpasses FT-RMT in OBD by 31.69× and 19.1× times at sender and receiver nodes, respectively. Furthermore, a speedup of 47.93× and 27.94× at sender and receiver nodes, respectively, is achieved with FT-SR-DMR in EAF over OBD with FT-RMT-QED.

Energy Analysis

Table 1 and FIG. 10 depict the energy consumption of the implementations. Results reveal that NFT OBD consumes 1.35× and 1.27× times lesser energy than NFT BD at the sender and receiver nodes, respectively. The FT-RMT based OBD was 1.98× more energy efficient than BD, whereas FT-RMT-QED based OBD was 1.88× more energy efficient than BD at the sender node. At the receive node, OBD consumes 1.97× and 1.67× times lesser energy than BD for FT-RMT and FT-RMT-QED, respectively. These energy savings stem from the modification of the security architecture and optimization of the security primitives codes for 32-bit ARM platform.

The comparison between EAF and BD revealed that NFT EAF was 6.05× and 3× times more energy efficient than NFT BD at sender and receiver nodes, respectively. At the sender node, EAF with FT-SR-DMR was 3.16× more energy efficient than BD with FT-RMT and 4.52× more energy efficient DMR uses redundant modules for FT, which increased the static power consumption of EAF.

QoS and Behavioral Reliability

Applicant conducted experiments to determine the maximum number of allowable recomputations at SBW ECUs to yield error-free results subject to the critical pure delay $D_p^{max}=8$ ms and $D_{canfd}^{channel}=0.118$ ms. The channel delay was obtained from the VECTOR CANOE™ simulations. The number of allowable recomputations represents the number of faults (soft errors in this context) the ECU can tolerate. Table 2, which was obtained using Equation 8, depicts rcc1, rcc2, and rct to yield correct result for the FAC function during faults. Applicant calculated rct because CAN and CAN FD buses do not provide FT and it is imperative that ECUs must be able to retransmit the message in case of transmission errors on the bus for correct and safe operation of the SBW system. Applicant notes that the number of faults tolerated at HW-ECU1 and FAA-ECU1 are given by (rcc1−1) and (rcc2−1), respectively, since error-free computations at HW-ECU1 and FAA-ECU1 still require one computational run-time for the FAA function. Table 2 presents the results for both BD and OBD. Results indicate that OBD can tolerate up to (rcc1−1)+(rcc2−1)=71 faults with one transmission error without violating the $D_p^{max}$ critical limit for FT-RMT technique. Comparison between BD and OBD revealed that OBD can tolerate 113% (2.13×) and 94% (1.94×) more faults on average than BD for FT-RMT and FT-RMT-QED, respectively. The table also shows the number of allowable retransmissions under the $D_p^{max}=8$ ms constraint. Results indicate that OBD permits 16.19× and 29.81× more retransmissions on average, respectively for FT-RMT and FT-RMT-QED operation mode, than BD for the same critical pure delay because of the lesser time in the ECU computations.

TABLE 2

The maximum number of allowed recomputations on ECUs and retransmissions on CAN FD bus to yield correct result for the FAC function during faults Baseline Design Implementation

| rtc | rcc1 with rcc2 = 1 | | rcc2 with rcc1 = 1 | |
| --- | --- | --- | --- | --- |
| | FT-RMT | FT-RMT-QED | FT-RMT | FT-RMT-QED |
| 1 | 18 | 12 | 18 | 14 |
| 2 | 17 | 12 | 18 | 14 |
| 5 | 17 | 11 | 17 | 13 |
| 10 | 15 | 10 | 15 | 15 |

Optimized Baseline Design Implementation

| rtc | rrcc1 with rcc2 = 1 | | rcc2 with rcc1 = 1 | |
| --- | --- | --- | --- | --- |
| | FT-RMT | FT-RMT-QED | | FT-RMT |
| 1 | 37 | 24 | 37 | 25 |
| 2 | 36 | 23 | 37 | 25 |
| 5 | 34 | 22 | 35 | 23 |
| 10 | 31 | 20 | 32 | 21 |

Feasibility Analysis

For a secure and dependable approach leveraging the proposed ECU design, the pure delay (D) and worst-case pure delay (Dc) were calculated to be 0.13516 ms and 0.15232 ms, respectively. The pure delay and response time were defined and formulated in the "QoS and Behavioral Reliability" sub-section herein. The pure delay and the response time for all the three implementations are shown, respectively, in Table 3 and Table 4. The pure delays for all the three implementations are well within, $D_p^{max}=8$ ms, of the critical threshold limit. Additionally, the response times also satisfies the critical response time of $T_{max}=11.5$ ms. The pure delay for OBD implementation was found to be 1.5× lesser than BD implementation, on average. Further, on average, the pure delay for EAF implementation is, respectively, 4.3× and 6.8× lesser than the OBD and BD implementations. Comparing, the response times, on average, OBD has 9.81% lesser response time than BD implementation. Moreover, the EAF implementation has a response time that is, on average, 12.34% and 21.49% lesser than that of OBD and BD implementations. Thus, Applicant's secure and FT ECU design (EAF) permits much more time for control processing of the implemented automotive function (e.g., SBW) as compared to the multicore-based implementations (BD and OBD). Moreover, the secure and FT ECU design is self-healing (i.e., recover from faults autonomously), and is able to meet the critical delay even in the presence of faults. These results verify the feasibility of our proposed secure and dependable approach and ECU architecture for automotive CPS.

TABLE 3

Pure delay (in ms) for BD, OBD, and EAF implementations

| Operational Mode | BD | OBD | EAF |
| --- | --- | --- | --- |
| NFT | 0.610 | 0.491 | 0.131 |
| FT-RMT/FT-SR-DMR | 0.930 | 0.528 | 0.135 |
| FT-RMT-QED/FT-SR-DMR | 1.204 | 0.728 | 0.135 |

TABLE 4

End-to-end delay or response time (in ms) for BD, OBD, and EAF Implementations for CAN FD channel delay of 0.118 ms and $D_{mech} + D_{sens} = 3.5$ ms

| Operational Mode | BD | OBD | EAF |
| --- | --- | --- | --- |
| NFT | 4.110 | 3.991 | 3.631 |
| FT-RMT/FT-SR-DMR | 4.430 | 4.028 | 3.635 |
| FT-RMT-QED/FT-SR-DMR | 4.704 | 4.228 | 3.635 |

CONCLUSIONS

To better meet automotive security and dependability requirements while adhering to stringent real-time constraints of automotive CPS, Applicant proposed a novel architecture for automotive ECUs. Applicant implemented the proposed ECU architecture on XILINX® AUTOMOTIVE™ (XA™) SPARTAN®-6 FPGA. Applicant also proposed a secure and dependable approach for cybercar design that leverages the proposed ECU architecture. Applicant demonstrated the effectiveness of the proposed architecture and approach using a SBW application over CAN FD as a case study. Applicant further optimized and implemented a prior secure and dependable automotive work on the NXP® quad-core iMX6Q SABRE automotive board. Results reveal that the optimized design can tolerate 113% (2.13×) more faults on average than the prior work (baseline design). Results also show that proposed ECU architecture can attain a speedup of 90.19× while consuming 4.52× lesser energy over baseline design. Furthermore, the proposed architecture can attain a speedup of 47.93× while consuming 2.4× lesser energy than optimized SABRE board implementation.

EQUIVALENTS

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

Although preferred embodiments of the invention have been described using specific terms, such description is for illustrative purposes only, and it is to be understood that changes and variations may be made without departing from the spirit or scope of the following claims.

The invention claimed is:

1. An automotive electronic control unit (ECU) comprising:
    an application processor; and
    one or more co-processors comprising multiple processing cores and communicatively coupled to the application processor, the one or more co-processors configured to:
       receive data from the application processor;
       encrypt the data received from the application processor by applying an encryption scheme and a message authentication code (MAC) to the data, wherein each byte of the data received by the encryption scheme is mapped to a separate thread for execution on a separate at least one core of a first set of the multiple processing cores;

process the encrypted data to detect faults and generate secure data that is encrypted and free from faults; and communicate the secure data to the application processor.

2. The automotive ECU of claim 1, wherein the one or more co-processors are further configured to:

receive second secure data from the application processor;

decrypt the second secure data;

process the decrypted data to detect faults and generate second data free from faults; and communicate the second data to the application processor.

3. The automotive ECU of claim 1, wherein the encryption scheme is AES-128 encryption and the MAC is SHA-3-based HMAC.

4. The automotive ECU of claim 1, wherein each lane of the MAC is mapped to a separate thread for execution on a separate at least one core of a second set of the multiple processing cores, wherein the first set and second set are non-overlapping.

5. The automotive ECU of claim 4, wherein the separate at least one core of the first set of multiple processing threads comprises a master encryption core and a slave encryption core and where the separate at least one core of the second set of the multiple processing cores comprises a master MAC core and a slave MAC core.

6. The automotive ECU of claim 5, wherein processing the encrypted data to detect faults and generate secure data that is encrypted and free from faults comprises comparing results of the master encryption core and the slave encryption core and comparing results of the master MAC core and the slave MAC core.

7. The automotive ECU of claim 1, wherein encrypting the data comprises implementing a plurality of redundant encryption scheme modules and a plurality of redundant MAC modules in parallel and comparing the results from each.

8. The automotive ECU of claim 7, wherein implementing the plurality of redundant encryption scheme modules and the plurality of redundant MAC modules in parallel comprises implementing at least three of each of the modules.

9. The automotive ECU of claim 7, wherein at least one of the plurality of redundant encryption scheme modules and at least one of plurality of redundant MAC modules are configured to be implemented based upon a detection of a fault in another one of the plurality of redundant encryption scheme modules and another one of the plurality of redundant MAC modules.

10. The automotive ECU of claim 9, wherein the one or more co-processors are further configured to reconfigure one or more of the faulty redundant modules.

11. The automotive ECU of claim 1, wherein the one or more co-processors are selected from the group consisting of: a field-programmable gate array (FPGA) and a general-purpose computing on graphics processing unit (GPGPU).

12. The automotive ECU of claim 1, wherein the application processor and the one or more co-processors are communicatively coupled via an expansion bus.

13. The automotive ECU of claim 12, wherein the expansion bus implements the Advanced Microcontroller Bus Architecture (AMBA) standard.

14. The automotive ECU of claim 1, wherein the application processor and the one or more co-processors are part of a first integrated circuit.

15. The automotive ECU of claim 1, wherein the application processor is communicatively coupled with one or more sensors and wherein the data is received from at least one of the one or more sensors.

16. The automotive ECU of claim 1, wherein the one or more co-processors comprises self-checking combinational circuits.

17. The automotive ECU of claim 16, wherein the self-checking combinational circuits are Berger-code-based totally self-checking combinational circuits.

* * * * *